Figure 1:
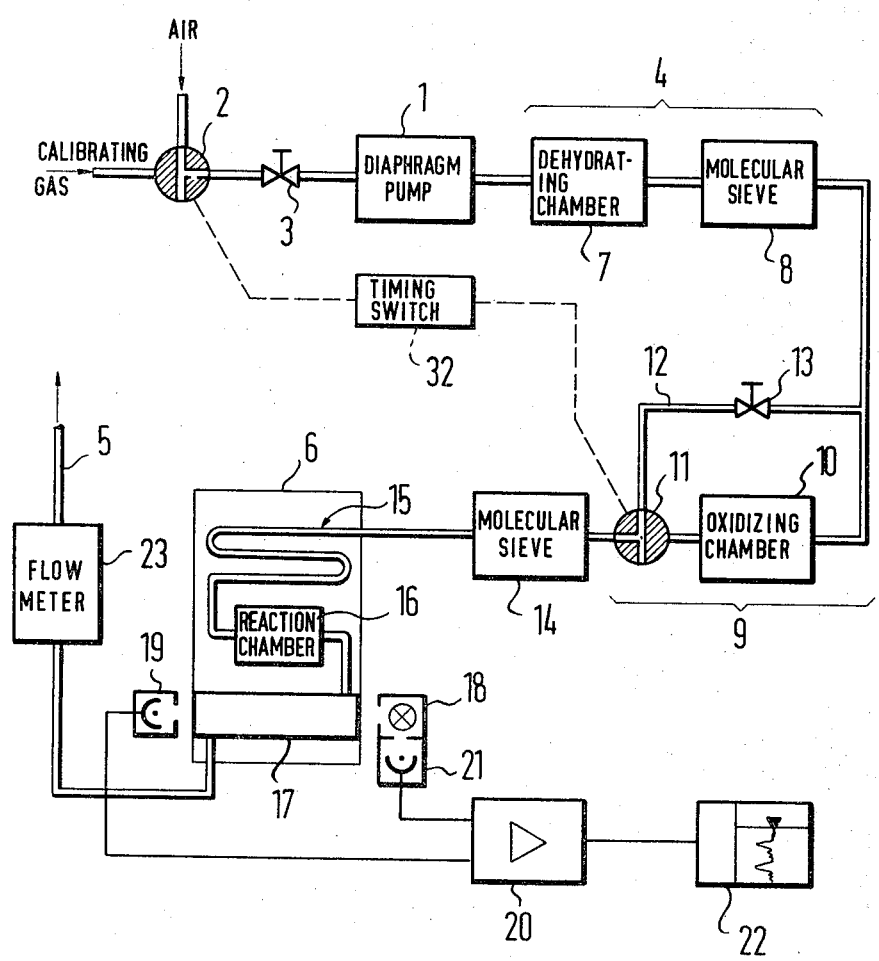

United States Patent [19]
Seiler et al.

[11] 3,871,827
[45] Mar. 18, 1975

[54] APPARATUS FOR DETERMINING SMALL AMOUNTS OF CARBON MONOXIDE OR HYDROGEN IN ATMOSPHERIC AIR

[75] Inventors: Wolfgang Seiler, Mainz-Gonsenheim; Ulrich Schmidt, Mainz-Finthen, both of Germany

[73] Assignee: Max-Planck-Gesellschaft zur Foerderung der Wissenschaften e.V., Goettingen, Germany

[22] Filed: Apr. 25, 1973

[21] Appl. No.: 354,307

[30] Foreign Application Priority Data
May 18, 1972  Germany............................ 2224408

[52] U.S. Cl.................. 23/254 R, 23/232 R, 55/68, 55/75, 356/36
[51] Int. Cl....................... G01n 21/26, G01n 31/00
[58] Field of Search............ 23/232 R, 254 R; 55/75

[56] References Cited
UNITED STATES PATENTS
3,150,942   9/1964   Vasan ................................ 55/75 X
3,285,701   11/1966  Robertson ......................... 23/232 R
3,420,636   1/1969   Robbins ............................ 23/254 R
3,650,090   3/1972   Temple .................................. 55/75
3,718,429   2/1973   Williamson, Jr. ................. 23/232 R Primary Examiner—Morris O. Wolk
Assistant Examiner—Sidney Marantz
Attorney, Agent, or Firm—Hans Berman; Kurt Kelman

[57] ABSTRACT

Carbon monoxide and hydrogen are determined in atmospheric air by reaction with yellow mercuric oxide at elevated temperature and optical determination of the elementary mercury in the air stream behind the reaction chamber. Water vapor is removed by drying and other reactive gases are eliminated by molecular sieves having suitably dimensioned pores before contact with the mercuric oxide. Hydrogen in the presence of carbon monoxide is determined by first selectively oxidizing the carbon monoxide to carbon dioxide. The effect of hydrogen on the carbon monoxide measurements is compensated for by a zero setting established after removal of the carbon monoxide. The temperature of the mercuric oxide is selected to minimize or maximize reaction with hydrogen.

13 Claims, 3 Drawing Figures

APPARATUS FOR DETERMINING SMALL AMOUNTS OF CARBON MONOXIDE OR HYDROGEN IN ATMOSPHERIC AIR

This invention relates to the quantitative determination of individual components of a gas mixture which are capable of reducing mercuric oxide to elementary mercury, and more particularly to apparatus for determining small amounts of carbon monoxide and of hydrogen in atmospheric air.

Traces of carbon monoxide and hydrogen are found in the atmosphere remote from sources of air pollution, and they may be introduced into the atmosphere as tracers in the investigation of circulation in the atmosphere. Larger amounts of these gases, of course, accumulate near industrial sites or large cities.

Carbon monoxide and hydrogen react with yellow mercuric oxide at elevated temperature, and the amount of elementary mercury formed thereby provides a measure of the reducing components in an air sample that has been permitted to interact with the mercuric oxide. It is known to utilize the known reaction in devices intended to indicate the concentration of reducing gases in the air, but the known devices are relatively insensitive and cannot reliably distinguish between the gases whose concentrations it is desired to measure and such other gaseous reducing agents as hydrocarbons. The known devices also are difficult to calibrate, and it is time-consuming to establish their zero setting.

It is an object of this invention to provide apparatus for determining even trace amounts of carbon monoxide and hydrogen in gas mixtures, such as air, which also contain other reducing components, and particularly to provide apparatus capable of operating automatically over extended periods of time without the intervention of a human operator.

With these and other objects in view, the invention provides apparatus for determining the concentration in a gas mixture of one gaseous component capable of reducing mercuric oxide to metallic mercury which includes a purifying unit permeable to the one component while impermeable to at least one other potential component of the mixture which is also capable of reducing mercuric oxide. An associated measuring unit measures the remainder of mercuric oxide reducing components in the purified mixture and includes means for heating the purified mixture to a reaction temperature sufficient to permit reaction of the one component of interest with mercuric oxide. A reaction chamber is maintained by the same heating device at the same temperature and is charged with mercuric oxide for contact with the heated purified mixture. A measuring cell is maintained by the heating means at least at the reaction temperature, and a stream of the gas mixture is conveyed sequentially through the purifying unit, the heating means, the reaction chamber, and the measuring cell. An optical sensing device responds to the presence of elementary mercury in the cell for producing indicia indicative of the mercury concentration in the cell. Such indicia are readily converted to data on the concentration of reducing components in the sample mixture.

Figure 2:
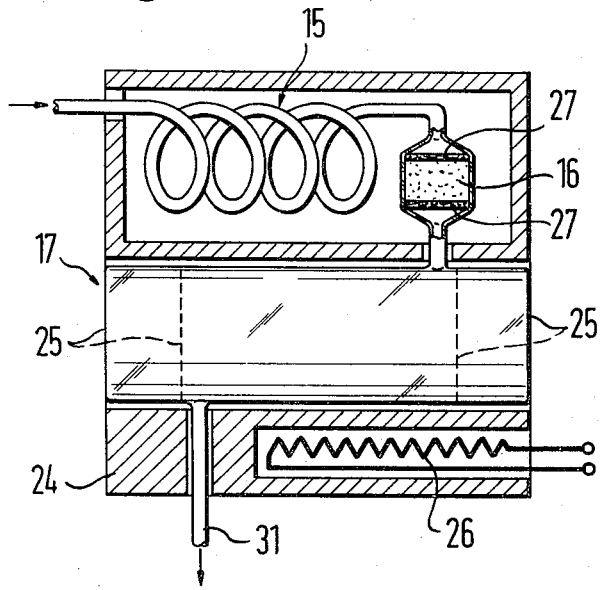
Figure 3:
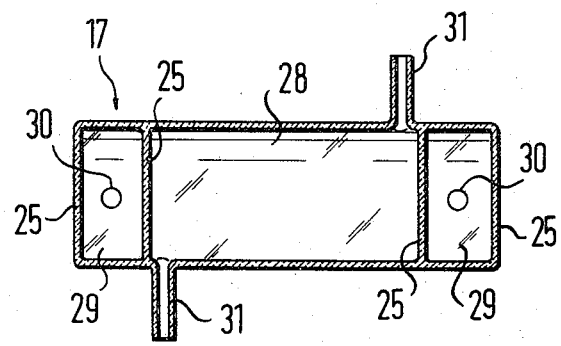

Other features, additional objects, and many of the attendant advantages of this invention will readily be appreciated as the same becomes better understood by reference to the following detailed description of a preferred embodiment when considered in connection with the appended drawing in which:

FIG. 1 is a flow sheet of apparatus of the invention;
FIG. 2 shows the measuring unit of the apparatus in fragmentary elevational section; and
FIG. 3 illustrates the cell of the measuring unit omitted from FIG. 2, in elevational section.

Referring now to the drawing in detail, and initially to FIG. 1, there is seen a diaphragm pump 1 which draws either ambient air or a calibrating gas through a solenoid-operated two-way valve 2, the flow of gas being set by means of a needle valve 3 at a constant rate of typically 40 liters per hour. The air sample or the calibrating gas mixture is driven by the pump 1 through the remainder of the apparatus at a pressure which is sufficiently above atmospheric pressure to prevent significant amounts of air from entering the apparatus through its discharge pipe 5 during short interruptions of gas flow, as during switching of the valve 2.

The gas mixture is pumped into a purifying unit 4 whose first element is a dehydrating chamber 7 filled with calcium chloride and/or phosphorus pentoxide, as is conventional. The moisture-free gas then passes through a first molecular sieve 8 which is protected by the desiccant in the chamber 7 against rapid clogging.

If it is desired to measure the carbon monoxide concentration in the atmosphere, the molecular sieve is chosen to have an average pore size of 10 Angstrom units. If a sieve of smaller pore size is chosen, the carbon monoxide passes through the sieve so slowly that short-term fluctuations of the carbon monoxide content cannot be measured. The sieve retains sulfur dioxide, formaldehyde, ammonia, hydrocarbons other than methane, hydrogen sulfide, and other trace contaminants of air which are capable of reducing mercuric oxide.

The sieve 8 is permeable to hydrogen, carbon monoxide, and methane, and these reducing gases then pass through a calibrating unit 9 or a by-pass conduit 12 to a measuring unit 6, depending on the position of a solenoid-operated two-way valve 11. The calibrating unit essentially consists of an oxidizing chamber 10 packed with silver oxide and maintained at a temperature of about 15° – 20°C in a conventional manner, not shown, if the atmospheric temperature should be lower. The silver oxide combines the carbon monoxide with amply available oxygen to carbon dioxide, when the valve 11 is set to pass the gas stream through the chamber 10. Normally, the gas stream passes through the by-pass conduit 12 which is equipped with a throttling valve 13 set in such a manner that the flow resistance of the by-pass equals that of the packed chamber 10, a fact readily ascertained by means of a flow meter 23 in the discharge pipe 5.

Before reaching the measuring unit 6, the gas mixture is passed through a second molecular sieve 14 provided mainly for retaining impurities picked up by the gas stream from preceding elements of the apparatus.

As is better seen in FIGS. 2 and 3, the entire measuring unit 6 is embedded in a steel block 24, and the gas stream passes through the block while being confined almost entirely by walls of fused silica. It first enters a helical tube 15 and is preheated within five seconds to a reaction temperature of 220°C, mainly by radiation from the inner steel walls of the block 24 which bound a cavity enclosing the helical tube or heating coil 15 and a reaction chamber 16. In the latter, approximately 0.4g granular, yellow mercuric oxide having a grain size of about 0.5 – 0.8 mm is retained between two porous plugs 27. The chamber 16 and its contents also are held at 220°C.

At that temperature, the mercuric oxide reacts with carbon monoxide within about 0.02 second to form a stoichiometrically equivalent amount of elementary mercury which is carried along by the gas stream. About 10% of the hydrogen present also reacts with the mercuric oxide and generates a corresponding amount of mercury. Methane does not interact significantly with mercuric oxide at the chosen temperature. A small amount of mercuric oxide dissociates spontaneously at 220°C.

The gas stream leaving the reaction chamber 16 enters a measuring cell 17 set into a conforming bore of the block 24, and indicated in phantom view only in FIG. 2. As is shown in FIG. 3, the cell 17 has a cylindrical wall 28 of fused silica, about 70 mm long and 30 mm in diameter, and the main cavity in the cell 17 is axially bounded by ground and polished window plates 25 of a glass practically opaque to light having a wavelength of less than 2200 Angstrom units, while being transparent to light of higher wavelength. Two additional window plates 25 axially offset from the central cell cavity are respectively associated with the first-mentioned window plates, and each pair of window plates 25 defines therebetween a chamber 29 communicating with the atmosphere through a vent opening 30 and thermally insulating the hot gas in the central cell cavity from the optical apparatus employed for measuring its mercury content.

The mercury-bearing gas enters and leaves the cell 17 through tubulures 31 whose orifices are at the opposite axial ends of the central cavity and oppositely spaced from the cell axis. This arrangement promotes uniform flow of the tested stream through the cell, and avoids the formation of stagnant pockets of gas.

The temperature of the block 24 and of the devices embedded therein is maintained by an electric resistance heater 26 spaced from the cell 17 in a direction away from the helical tube 15 and the reaction chamber 16. As is conventional in itself, but not explicitly shown, a temperature sensing element is located near the reaction chamber 16 and controls the heating current supplied to the heater 26 in such a manner as to maintain the desired constant temperature of 220°C in the mercuric oxide charge in the chamber 16. Heat is lost from the surface of the block 24 to the ambient atmosphere, and the cell 17, being closer to the heating element 26 than the reaction chamber 16, is maintained at a temperature of approximately 250°C.

Reverting to FIG. 1, there is seen a low-pressure mercury vapor lamp 18 at one axial end of the cell 17, and a photoelectric cell 19 at the other end. The shorter wave-lengths are filtered out by the window plates 25, and the radiation passing through the cell 17 has a predominant wave length of 2537 Angstrom units, too long to cause formation of ozone from the oxygen present, and oxidation of the mercury to mercuric oxide by the ozone. Any HgO present is likely to undergo thermal decomposition at the prevailing temperature.

The output of the photoelectric cell 19 is fed to one input terminal of a differential amplifier 20 whose output operates the stylus on a travelling-strip recorder 22. The other input terminal of the amplifier 20 is connected to a photoelectric cell 21 directly exposed to the light of the mercury vapor lamp 18 so that the recorded values are not affected by gradual output loss of the lamp 18, and are a unique function of the absorption of light in the cell 17.

A timing switch 32 from time to time briefly energizes the solenoids of the valves 2 and 11. When the solenoid of the valve 2 is energized, a gas mixture of known composition is pumped through the apparatus and provides a control track in the recorder 22. When the solenoid of the valve 11 is energized, the gas stream passes through the oxidizing chamber 10 rather than the by-pass conduit 12, and the value read from the recorder 22 constitutes the zero line against which the carbon monoxide readings have to be gaged. The zero line represents the amount of elementary mercury generated by spontaneous decomposition of HgO, by hydrogen, and by other reducing gases effective at 220°C which may escape through the molecular sieves 8 and 14. Normally, the zero value is but a small fraction of the ordinary carbon monoxide reading, and minor errors and fluctuations in the zero value do not significantly affect the accuracy and precision of the recorded carbon monoxide values.

Because of the afore-described arrangements of the tubulures 31, the new composition of the contents in the cell 17 is rapidly established after each switching movement of the valve 11 so that a correct zero can be recorded within a very short time. The relatively high temperature of the cell 17, safely maintained by the insulating chambers 29, is a significant contributing factor in accelerating a correct zero reading.

The fused silica employed as the material of construction for almost all walls enclosing the analyzed gas has been found to contribute materially to the precision of the readings produced by the illustrated apparatus.

The yellow form of mercuric oxide is more reactive than the red oxide and can be reduced by carbon monoxide at temperatures as low as 180°C, and is preferred because of better sensitivity even where the optimum temperature of 220°C can be maintained reliably. A grain size of 0.5 – 0.8 mm provides the most desirable compromise between large exposed surface for quick reaction and low flow resistance.

The apparatus described above with reference to its function for measuring the carbon monoxide concentration of air is readily modified for determining hydrogen in air or similar gas mixtures.

The molecular sieve 8 is chosen to have a pore size of about 5 Angstrom units to exclude as much as possible of all oxidizable gases other than hydrogen, all gas is passed through the oxidation chamber 10 to oxidize carbon monoxide, and the non-illustrated thermoregulator for the resistance heater 26 is set to maintain a temperature of at least 200°, but preferably 250°C in the reaction chamber 16, the cell 17 being held at an even higher temperature.

It is preferred, however, but not illustrated, to arrange a chamber containing a $Ag_2O$ charge immediately behind the molecular sieve 8, so that all gas discharged from the sieve 8 passes through the silver oxide, and all carbon monoxide is oxidized to carbon dioxide, whether it flows through the by-pass conduit 12 or not.

The chamber 10 is filled with an oxidizing agent commercially available as hopcalite and capable of completely oxidizing hydrogen at room temperature of 15° to 20°C. It essentially consists of approximately 50% manganese dioxide, 30% cupric oxide, 15% cobalt oxide, and 5% silver oxide. The hopcalite permits calibration for a zero reading as described above with reference to the carbon monoxide determination. The molecular sieve 14 is chosen to have a pore size of 5 Angstrom units on an average if hydrogen is to be determined. The mode of operation does not otherwise differ from that described with reference to carbon monoxide.

Apparatus of the type described has been found capable of detecting carbon monoxide in amounts of 0.001 p.p.m. and up with a precision of ± 3%, and hydrogen from about 0.01 p.p.m. with equal precision. Obviously, it can be modified to analyze gas mixtures other than atmospheric air for components capable of reacting with mercuric oxide to form mercury.

The recorder 22 and the timing switch 32 may be operated by clockwork mechanisms precise enough to provide synchronization without any mechanical or electrical connection. However, it is conventional to provide timing switches on a recorder or to operate recorder charts and timing switches by means of the same electric motor for synchronization so that tracks produced with the valve solenoids 2 or 11 energized may readily be recognized.

It should be understood, therefore, that the foregoing disclosure relates only to preferred embodiments of the invention, and that it is intended to cover all changes and modifications of the example of the invention herein chosen for the purpose of the disclosure which do not constitute departures from the spirit and scope of the appended claims.

What is claimed is:

1. Apparatus for determining the concentration in a gas mixture of one gaseous component capable of reducing mercuric oxide to metallic mecury, said apparatus comprising:
    a. purifying means permeable to said component while substantially impervious to at least one other component of said mixture capable of reducing said mercuric oxide;
    b. measuring means for measuring the remainder of mercuric oxide reducing components in the purified mixture, said measuring means including:
        1. heating means for heating said purified mixture to a reaction temperature sufficient to permit reaction of said one component with mercuric oxide,
        2. a reaction chamber maintained by said heating means at said temperature and charged with yellow mercuric oxide for contact with the heated purified mixture, and
        3. a measuring cell maintained by said heating means at least at said temperature;
    c. conveying means for passing a stream of said mixture sequentially through said purifying means, said heating means, said reaction chamber, and said measuring cell; and
    d. optical sensing means responsive to the presence of elementary mercury in said cell for producing indicia indicative of the concentration of mercury in said cell.

2. Apparatus as set forth in claim 1, wherein said measuring means include a body of heat conducting metal, said cell being embedded in said body, and said heating means including a heating element embedded in said body and offset from said cell in one direction, said reaction chamber being embedded in said body and offset from said cell in a direction away from said heating element.

3. Apparatus as set forth in claim 2, wherein said heating means further include a conduit connecting said purifying means to said reaction chamber and embedded in said body, respective walls of said conduit, said chamber, and said cell in contact with said mixture consisting essentially of fused silica.

4. Apparatus as set forth in claim 3, wherein said cell has a cavity of substantially cylindrical shape bounded at each axial end by two spacedly parallel windows, the windows at each axial end defining an insulating chamber sealed from said cavity.

5. Apparatus as set forth in claim 4, wherein said cell has an inlet orifice and an outlet orifice, said orifices each communicating with said cavity and being spaced from each other along the axis of said cavity and in opposite radial direction from said axis.

6. Apparatus as set forth in claim 5, wherein said windows are substantially impervious to light having a wave length of less than 2200 Angstrom units while being substantially fully transparent to light of greater wavelength.

7. Apparatus as set forth in claim 3, wherein said conduit is a helical tube.

8. Apparatus as set forth in claim 1, wherein said mercuric oxide is granular, having a grain size of not less than 0.5 mm.

9. Apparatus as set forth in claim 1, wherein said conveying means include a pump arranged ahead of said purifying means in the direction of flow of said stream.

10. Apparatus as set forth in claim 1, wherein atmospheric air is a predominant component of said mixture, said one component is carbon monoxide, said purifying means include drying means for removing moisture from said air, and a molecular sieve having a pore size of approximately 10 Angstrom units, and said reaction temperature is 180° – 220°C.

11. Apparatus as set forth in claim 1, wherein atmospheric air is a predominant component of said mixture, said one component is hydrogen, said purifying means include drying means for removing moisture from said air, a molecular sieve having aan average pore size of approximately 5 Angstrom units, and oxidizing means for selectively oxidizing present carbon monoxide to carbon dioxide, said conveying means passing said air sequentially through said drying means, said sieve, and said oxidizing means, and said reaction temperature being 200° to 250°C.

12. Apparatus as set forth in claim 1, further comprising zero setting means for establishing indicia representative of the absence of said one component, said zero setting means including oxidizing means for oxidizing said one component to a gas incapable of reacting with said mercuric oxide at said reaction temperature and a by-pass conduit, said oxidizing means and said by-pass conduit being interposed in parallel arrangement between said purifying means and said measuring means, selector valve means for alternatively passing said stream through said ozidizing means and said by-pass conduit, and adjustable throttling means in said by-pass conduit for equalizing the flow resistance of said by-pass conduit and of said oxidizing means.

13. Apparatus as set forth in claim 12, wherein said sensing means include recording means for producing a durable record of said concentration of mercury, and timing means operatively connected to said selector valve means for operating the valve means in timed sequence with operation of said recording means.

* * * * *